(12) United States Patent
Mahaffey et al.

(10) Patent No.: US 9,208,215 B2
(45) Date of Patent: Dec. 8, 2015

(54) USER CLASSIFICATION BASED ON DATA GATHERED FROM A COMPUTING DEVICE

(71) Applicant: Lookout, Inc., San Francisco, CA (US)

(72) Inventors: Kevin Mahaffey, San Francisco, CA (US); Brian James Buck, Livermore, CA (US); Thomson Van Nguyen, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 84 days.

(21) Appl. No.: 13/728,189

(22) Filed: Dec. 27, 2012

(65) Prior Publication Data
US 2014/0188886 A1  Jul. 3, 2014

(51) Int. Cl.
*G06F 7/00* (2006.01)
*G06F 17/30* (2006.01)

(52) U.S. Cl.
CPC .... *G06F 17/30598* (2013.01); *G06F 17/30141* (2013.01); *G06F 17/30144* (2013.01); *G06F 17/30994* (2013.01)

(58) Field of Classification Search
None
See application file for complete search history.

(56) References Cited

U.S. PATENT DOCUMENTS

| | | | |
|---|---|---|---|
| 3,416,032 A | 12/1968 | Jahns et al. | |
| 4,553,257 A | 11/1985 | Mori et al. | |
| 5,319,776 A | 6/1994 | Hile et al. | |
| 5,574,775 A | 11/1996 | Miller, II et al. | |
| 5,715,518 A | 2/1998 | Barrere et al. | |
| 6,185,689 B1 | 2/2001 | Todd, Sr. et al. | |
| 6,269,456 B1 | 7/2001 | Hodges et al. | |
| 6,272,353 B1 | 8/2001 | Dicker et al. | |
| 6,301,668 B1 | 10/2001 | Gleichauf et al. | |
| 6,453,345 B2 | 9/2002 | Trcka et al. | |
| 6,476,828 B1 * | 11/2002 | Burkett et al. | 715/760 |
| 6,502,131 B1 * | 12/2002 | Vaid et al. | 709/224 |
| 6,529,143 B2 | 3/2003 | Mikkola et al. | |
| 6,696,941 B2 | 2/2004 | Baker | |
| 6,707,476 B1 * | 3/2004 | Hochstedler | 715/789 |
| 6,748,195 B1 * | 6/2004 | Phillips | 455/41.2 |
| 6,792,543 B2 | 9/2004 | Pak et al. | |
| 6,892,225 B1 | 5/2005 | Tu et al. | |
| 6,907,530 B2 | 6/2005 | Wang | |
| 6,959,184 B1 | 10/2005 | Byers et al. | |
| 7,020,895 B2 | 3/2006 | Albrecht | |

(Continued)

FOREIGN PATENT DOCUMENTS

| | | |
|---|---|---|
| EP | 2765750 | 8/2014 |
| GB | 2430588 | 3/2007 |

(Continued)

OTHER PUBLICATIONS

Benyon et al., "Applying user modelling to human-computer interaction design" AI Review 7, pp. 199-225, 1993, Kluwer Academic Publishers.*

(Continued)

*Primary Examiner* — Michael Hicks
(74) *Attorney, Agent, or Firm* — Greenberg Traurig LLP

(57) ABSTRACT

Data regarding user actions on a user device is gathered from the user device (and/or from another computing device) by a server. The data is analyzed to make a decision. The decision is sent by the server to the user device (e.g., directly or via another computing device) and then used by the user device to implement a new action on the user device. This process may be automatically repeated in order to provide real-time customization of the user device.

20 Claims, 5 Drawing Sheets

(56) References Cited

U.S. PATENT DOCUMENTS

| | | | |
|---|---|---|---|
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,036 B2 | 1/2007 | Hinchliffe et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,203,909 B1 * | 4/2007 | Horvitz et al. ............... 715/765 |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,266,845 B2 | 9/2007 | Hypponen |
| 7,290,276 B2 | 10/2007 | Ogata |
| 7,304,570 B2 | 12/2007 | Thomas et al. |
| 7,305,245 B2 | 12/2007 | Alizadeh-Shabdiz et al. |
| 7,308,256 B2 | 12/2007 | Morota et al. |
| 7,308,712 B2 | 12/2007 | Banzhof |
| 7,325,249 B2 | 1/2008 | Sutton, Jr. et al. |
| 7,346,605 B1 | 3/2008 | Hepworth et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,064 B1 | 7/2008 | Arone et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,437,158 B2 | 10/2008 | Russell |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,493,403 B2 | 2/2009 | Shull et al. |
| 7,502,620 B2 | 3/2009 | Morgan et al. |
| 7,515,578 B2 | 4/2009 | Alizadeh-Shabdiz et al. |
| 7,525,541 B2 | 4/2009 | Chun et al. |
| 7,526,297 B1 | 4/2009 | Holur et al. |
| 7,539,882 B2 | 5/2009 | Jessup et al. |
| 7,551,579 B2 | 6/2009 | Alizadeh-Shabdiz et al. |
| 7,551,929 B2 | 6/2009 | Alizadeh-Shabdiz et al. |
| 7,568,220 B2 | 7/2009 | Burshan |
| 7,610,273 B2 | 10/2009 | Kuppusamy et al. |
| 7,634,800 B2 | 12/2009 | Ide et al. |
| 7,685,132 B2 | 3/2010 | Hyman |
| 7,696,923 B2 | 4/2010 | Houri |
| 7,761,583 B2 | 7/2010 | Shull et al. |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,813,745 B2 | 10/2010 | Li |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,877,784 B2 | 1/2011 | Chow et al. |
| 7,882,247 B2 | 2/2011 | Sturniolo et al. |
| 7,882,557 B2 | 2/2011 | Coskun et al. |
| 7,890,938 B2 | 2/2011 | Jensen et al. |
| 7,907,966 B1 | 3/2011 | Mammen |
| 7,916,661 B2 | 3/2011 | Alizadeh-Shabdiz et al. |
| 7,978,691 B1 | 7/2011 | Cole |
| 7,991,854 B2 | 8/2011 | Bahl |
| 7,999,742 B2 | 8/2011 | Alizadeh-Shabdiz |
| 8,001,610 B1 | 8/2011 | Chickering et al. |
| 8,014,788 B2 | 9/2011 | Alizadeh-Shabdiz et al. |
| 8,019,357 B2 | 9/2011 | Alizadeh-Shabdiz et al. |
| 8,024,711 B2 | 9/2011 | Albahari et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz et al. |
| 8,095,172 B1 | 1/2012 | Cole et al. |
| 8,099,764 B2 | 1/2012 | Herzog et al. |
| 8,108,555 B2 | 1/2012 | Awadallah et al. |
| 8,112,797 B2 | 2/2012 | Coskun et al. |
| 8,121,617 B1 | 2/2012 | LaGrotta et al. |
| 8,126,456 B2 | 2/2012 | Lotter et al. |
| 8,126,866 B1 | 2/2012 | Barton et al. |
| 8,127,158 B2 | 2/2012 | Jessup et al. |
| 8,127,350 B2 | 2/2012 | Wei et al. |
| 8,127,358 B1 | 2/2012 | Lee |
| 8,135,395 B2 | 3/2012 | Cassett et al. |
| 8,195,196 B2 | 6/2012 | Haran et al. |
| 8,200,773 B2 | 6/2012 | Bluestone et al. |
| 8,214,910 B1 | 7/2012 | Gossweiler, III et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,359,016 B2 | 1/2013 | Lindeman et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,434,151 B1 | 4/2013 | Franklin |
| 8,447,856 B2 | 5/2013 | Drako |
| 8,463,915 B1 | 6/2013 | Kim |
| 8,464,335 B1 | 6/2013 | Sinha et al. |
| 8,484,332 B2 | 7/2013 | Bush et al. |
| 8,504,775 B2 | 8/2013 | Plamondon |
| 8,589,691 B1 | 11/2013 | Hackborn et al. |
| 8,650,558 B2 | 2/2014 | DePoy |
| 8,650,649 B1 | 2/2014 | Chen et al. |
| 8,701,192 B1 | 4/2014 | Glick et al. |
| 8,756,432 B1 | 6/2014 | Chen et al. |
| 8,806,643 B2 | 8/2014 | Nachenberg |
| 8,814,650 B2 | 8/2014 | Cockerille et al. |
| 8,914,893 B2 | 12/2014 | Zhao et al. |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108005 A1 | 8/2002 | Larson et al. |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker, V et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2003/0233566 A1 | 12/2003 | Kouznetsov et al. |
| 2004/0022258 A1 | 2/2004 | Tsukada et al. |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0205419 A1 | 10/2004 | Liang et al. |
| 2004/0209608 A1 | 10/2004 | Kouznetsov et al. |
| 2004/0225887 A1 | 11/2004 | O'Neil et al. |

(56) References Cited

U.S. PATENT DOCUMENTS

| | | |
|---|---|---|
| 2004/0259532 A1 | 12/2004 | Isomaki et al. |
| 2005/0010821 A1 | 1/2005 | Cooper et al. |
| 2005/0010921 A1 | 1/2005 | Sueyoshi |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0182792 A1 | 8/2005 | Israel et al. |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Hapamas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0048142 A1 | 3/2006 | Roese et al. |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0129601 A1 | 6/2006 | Chang et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0191011 A1 | 8/2006 | Korkishko et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011192 A1 | 1/2007 | Barton |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028302 A1 | 2/2007 | Brennan et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0039053 A1 | 2/2007 | Dvir |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186275 A1 | 8/2007 | Shahbazi |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Comparetti et al. |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0270212 A1 | 11/2007 | Cockerille et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0120611 A1 | 5/2008 | Aaron |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0275992 A1 | 11/2008 | Basty et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0064330 A1 | 3/2009 | Shraim et al. |
| 2009/0070283 A1 | 3/2009 | Kang et al. |
| 2009/0119143 A1 | 5/2009 | Silver et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0282485 A1 | 11/2009 | Bennett |
| 2009/0292487 A1 | 11/2009 | Duncan et al. |
| 2009/0293125 A1 | 11/2009 | Szor |
| 2009/0319998 A1 | 12/2009 | Sobel et al. |
| 2010/0005291 A1 | 1/2010 | Hulten et al. |
| 2010/0019731 A1 | 1/2010 | Connolly et al. |
| 2010/0041946 A1 | 2/2010 | Kim |
| 2010/0058468 A1 | 3/2010 | Green et al. |
| 2010/0064341 A1 | 3/2010 | Aldera |
| 2010/0064344 A1 | 3/2010 | Wang |
| 2010/0088398 A1 | 4/2010 | Plamondon |
| 2010/0097494 A1 | 4/2010 | Gum et al. |
| 2010/0100591 A1 | 4/2010 | Mahaffey et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey |
| 2010/0100964 A1 | 4/2010 | Mahaffey et al. |
| 2010/0138501 A1 | 6/2010 | Clinton et al. |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0240419 A1 | 9/2010 | Horino |
| 2010/0250603 A1 | 9/2010 | Balakrishnaiah et al. |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0022681 A1 | 1/2011 | Simeonov |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |

(56) References Cited

U.S. PATENT DOCUMENTS

| | | | |
|---|---|---|---|
| 2011/0047620 A1 | 2/2011 | Mahaffey et al. | |
| 2011/0107414 A1 | 5/2011 | Diab et al. | |
| 2011/0119765 A1 | 5/2011 | Hering et al. | |
| 2011/0145920 A1 | 6/2011 | Mahaffey et al. | |
| 2011/0154439 A1 | 6/2011 | Patel et al. | |
| 2011/0171923 A1 | 7/2011 | Daly et al. | |
| 2011/0173071 A1 | 7/2011 | Meyer et al. | |
| 2011/0235624 A1 | 9/2011 | Scott et al. | |
| 2011/0241872 A1 | 10/2011 | Mahaffey | |
| 2011/0296401 A1 | 12/2011 | DePoy | |
| 2011/0296510 A1 | 12/2011 | Hatlelid et al. | |
| 2012/0011439 A1 | 1/2012 | Karn et al. | |
| 2012/0042257 A1 | 2/2012 | Aftab et al. | |
| 2012/0042382 A1 | 2/2012 | Mahaffey | |
| 2012/0054277 A1* | 3/2012 | Gedikian | 709/204 |
| 2012/0059822 A1 | 3/2012 | Malandain et al. | |
| 2012/0060222 A1 | 3/2012 | Mahaffey et al. | |
| 2012/0072569 A1 | 3/2012 | Xu | |
| 2012/0084836 A1 | 4/2012 | Mahaffey et al. | |
| 2012/0084864 A1 | 4/2012 | Mahaffey et al. | |
| 2012/0096516 A1 | 4/2012 | Sobel et al. | |
| 2012/0096555 A1 | 4/2012 | Mahaffey | |
| 2012/0102568 A1 | 4/2012 | Tarbotton et al. | |
| 2012/0110174 A1 | 5/2012 | Wootton et al. | |
| 2012/0124239 A1 | 5/2012 | Shribman et al. | |
| 2012/0129503 A1 | 5/2012 | Lindeman et al. | |
| 2012/0159434 A1 | 6/2012 | Dang et al. | |
| 2012/0159578 A1 | 6/2012 | Chawla et al. | |
| 2012/0159607 A1 | 6/2012 | Wei et al. | |
| 2012/0159636 A1 | 6/2012 | Pandya et al. | |
| 2012/0173680 A1 | 7/2012 | Coskun et al. | |
| 2012/0179801 A1 | 7/2012 | Luna et al. | |
| 2012/0179814 A1 | 7/2012 | Swildens et al. | |
| 2012/0188064 A1 | 7/2012 | Mahaffey et al. | |
| 2012/0196571 A1 | 8/2012 | Grkov et al. | |
| 2012/0215938 A1 | 8/2012 | Fletcher et al. | |
| 2012/0222120 A1 | 8/2012 | Rim et al. | |
| 2012/0233674 A1 | 9/2012 | Gladstone et al. | |
| 2012/0233694 A1 | 9/2012 | Baliga et al. | |
| 2012/0233695 A1 | 9/2012 | Mahaffey et al. | |
| 2012/0240183 A1 | 9/2012 | Sinha | |
| 2012/0246499 A1 | 9/2012 | Jessup et al. | |
| 2012/0254285 A1 | 10/2012 | Tiger et al. | |
| 2012/0259954 A1 | 10/2012 | McCarthy et al. | |
| 2012/0278467 A1 | 11/2012 | Schneider | |
| 2012/0303735 A1 | 11/2012 | Raciborski et al. | |
| 2012/0311659 A1 | 12/2012 | Narain et al. | |
| 2012/0317153 A1 | 12/2012 | Parthasarathy et al. | |
| 2012/0317233 A1 | 12/2012 | Redpath | |
| 2012/0317370 A1 | 12/2012 | Luna | |
| 2012/0324076 A1 | 12/2012 | Zerr et al. | |
| 2012/0324094 A1 | 12/2012 | Wyatt et al. | |
| 2012/0324259 A1 | 12/2012 | Aasheim et al. | |
| 2012/0324568 A1 | 12/2012 | Wyatt et al. | |
| 2013/0013775 A1 | 1/2013 | Baumback et al. | |
| 2013/0019311 A1 | 1/2013 | Swildens et al. | |
| 2013/0023209 A1 | 1/2013 | Fisher et al. | |
| 2013/0041946 A1 | 2/2013 | Joel et al. | |
| 2013/0041974 A1 | 2/2013 | Luna et al. | |
| 2013/0047034 A1 | 2/2013 | Salomon et al. | |
| 2013/0054796 A1 | 2/2013 | Baumback et al. | |
| 2013/0054960 A1 | 2/2013 | Grab et al. | |
| 2013/0055405 A1 | 2/2013 | Zhao et al. | |
| 2013/0067054 A1 | 3/2013 | Pulleyn et al. | |
| 2013/0086682 A1 | 4/2013 | Mahaffey et al. | |
| 2013/0097710 A1 | 4/2013 | Basavapatna et al. | |
| 2013/0111597 A1 | 5/2013 | Gossweiler, III et al. | |
| 2013/0117854 A1 | 5/2013 | Britton et al. | |
| 2013/0132330 A1 | 5/2013 | Hurwitz et al. | |
| 2013/0132565 A1 | 5/2013 | Cetin et al. | |
| 2013/0152047 A1 | 6/2013 | Moorthi et al. | |
| 2013/0159719 A1 | 6/2013 | Ha et al. | |
| 2013/0167136 A1 | 6/2013 | Goldman | |
| 2013/0212684 A1 | 8/2013 | Li et al. | |
| 2013/0283377 A1 | 10/2013 | Das et al. | |
| 2013/0298244 A1 | 11/2013 | Kumar et al. | |
| 2013/0303154 A1 | 11/2013 | Gupta et al. | |
| 2013/0325779 A1* | 12/2013 | Shahshahani et al. | 706/46 |
| 2013/0326476 A1 | 12/2013 | Wyatt et al. | |
| 2013/0326477 A1 | 12/2013 | Wyatt et al. | |
| 2014/0006418 A1 | 1/2014 | Forte et al. | |
| 2014/0041037 A1 | 2/2014 | Bhatia et al. | |
| 2014/0113588 A1 | 4/2014 | Chekina et al. | |
| 2014/0123289 A1 | 5/2014 | Hsiao et al. | |
| 2014/0150096 A1 | 5/2014 | Moon et al. | |
| 2014/0379853 A1 | 12/2014 | Shelton | |
| 2015/0067830 A1 | 3/2015 | Johansson et al. | |
| 2015/0088955 A1 | 3/2015 | Hendrick et al. | |
| 2015/0169877 A1 | 6/2015 | Mahaffey et al. | |
| 2015/0172057 A1 | 6/2015 | Mahaffey et al. | |
| 2015/0172060 A1 | 6/2015 | Mahaffey et al. | |
| 2015/0172146 A1 | 6/2015 | Mahaffey et al. | |

FOREIGN PATENT DOCUMENTS

| | | |
|---|---|---|
| KR | 1020090044656 | 5/2009 |
| KR | 101143999 | 5/2012 |
| WO | 2005101789 | 10/2005 |
| WO | 2006110181 | 10/2006 |
| WO | 2008007111 | 3/2007 |
| WO | 2007081356 | 7/2007 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Ghazarian et al., "Automatic detection of users' skill levels using high-frequency interface events", User Model User adap-ltnter 20, pp. 109-146, 2010, Springer Science+Business Mediea B.V.*

Fleurey et al., "A Domain Specific Modeling Language Supporting Specification, Simulation and Execution of Dynamic Adaptive Systems", Models 2009, LNCS 5795, pp. 606-621, 2009, Springer-Verlag Berlin Heidelberg.*

Hervas et al., "Towards the ubiquitous visualization: Adaptive user-interfaces based on the Semantic Web", Interacting with Computers 23, pp. 40-56, 2011, Elsevier B.V.*

Leiva Torres et al., "A Gesture Inference Methodology for User Evaluation Based on Mouse Activity Tracking", Proceedings of the IADIS International Conference Interfaces and Human Computer Interaction 2008, part of the IADIS Multi-Conference on Computer Science and Information Systems 2008, MCCSIS'08, pp. 18-26, IADIS Press, 2008.*

"Berry Locator", available at http://www.mobireport.com/apps/bl/, 2007, Mobireport LLC, 1 page.

"F-Secure Mobile Security for S60 User's Guide," F-Secure Corporation 2009, 34 pages.

"Firefox," Wikipedia, Jul. 20, 2011, available at <http://en.wikipedia.org/wiki/firefox> retrieved Aug 10, 2011, 37 pages.

"Java Virtual Machine," Wikipedia, Aug. 7, 2011, available at <http://en.wikipedia.org/wiki/Java_Virtual_Machine> retrieved Aug 10, 2011, 7 pages.

"Kaspersky AV," Kaspersky Lab 1997-2007, 1 page.

"Kaspersky Mobile Security—Anti Theft", Kaspersky Lab 2008, available at http://www.kaspersky.com/ kaspersky_mobile_security, 2 Pages.

"Kaspersky Mobile Security—Home Computer Security," Kaspersky Lab 2008, available at <http://www.kaspersky.com/kaspersky_mobile_security> , 1 pages.

"Norton Smartphone Security," Symantec, 2007, available at <http://www.symantec.com/norton/smartphone-security> retrieved Oct. 21, 2008, 2 pages.

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

"Real world Computing" Jun. 16, 2008 (PC Pro) pp. 1.

"Sprint—Report that your device is lost or stolen", web page downloaded Apr. 11, 2013 from http://support.sprint.com/support/article/Report_that_your_device_is_lost_or_stolen/case-ba416758-20090629-143222.

(56) References Cited

OTHER PUBLICATIONS

"Symantec Endpoint Protection," Symantec, 2008, available at <http://www.symantec.com/business/products/family.jsp?familyid=endpointsecurity>, 6 pages.

"Symantec Mobile Security Suite for Windows Mobile," Symantec, 2008, available at <http://www.symantec.com/business/products/sysreq.jsp?pcid=2241&pvid=mobile_security_suite_1>, 5 pages.

"TippingPoint Security Management System (SMS)," TippingPoint, available at <http://www.tippingpoint.com/products_sms.html>, 2 pages.

"Virgin Media—Phone Lost or Stolen?", web page downloaded Apr. 11, 2013 from http://www.virginmobile.com/vm/ukCoverage.do?contentId=insurance.howdoi.sm283.

Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.

Clickatell, available at http://www.clickatell.com, retrieved Sep. 14, 2011, published on Jan 18, 2011, 11 pages.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.

Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.

Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.

Final Office Action dated Feb. 1, 2011 for U.S. Appl. No. 12/255,626, filed Oct. 21, 2008; pp. 1-18.

Google Patent US 20070039053.

Grafio "Stay Secure," Opera Software, Sep. 29, 2008, available at <http://widgets.opera.com/widget/4495> retrieved Oct. 21, 2008, 4 pages.

HTC "Mobile Wipe Smart Phone Management", pp. 1-4, published on Dec. 5, 2007, retrieved on Dec. 5, 2007.

International Patent Application PCT/US2013/043569, International Search Report and Written Opinion, Aug. 27, 2013.

International Search Report for PCT Appln. No. PCT/US2009/061370 dated Dec. 14, 2009.

International Search Report for PCT Appln. No. PCT/US2009/061372 dated Mar. 24, 2010.

Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.

Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.

Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.

Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.

McAfee Knowledge Base Corporate KB60224 http://www.kc.mcafee.com/corporate/index?page=content&id=KB60224.

McAfee Technical Brief zero day to real time http://www.mcafee.com/us/local_content/technical_briefs/wp_zero_day_to_real_time_zip.

McAfee Technical Brief artemis http://www.mcafee.com/us/local_content/technical_briefs/technical_brief_artemis.zip.

McAfee, Internet Archive, Way Back Machine, available at <http://web.archive.org/web/20080517102505/www.mcafeesecure.com/us/technology-intro.jsp>, retrieved Feb. 23, 2011, 2 pages.

Non-Final Office Action dated Dec. 26, 2012 for U.S. Appl. No. 13/160,382, filed Jun. 14, 2011; pp. 1-23.

Non-Final Office Action dated Mar. 24, 2011 for U.S. Appl. No. 12/255,635, filed Oct. 21, 2008; pp. 1-17.

Non-Final Office Action dated Apr. 13, 2011 for U.S. Appl. No. 12/255,621, filed Oct. 21, 2008; pp. 1-7.

Norton Insight A solution to Performance http://community.norton.com/t5/Norton-Protection-Blog/Norton-Insight-A-solution-to-performance-improvement-without/ba-p/20642.

Notice of Allowance dated Nov. 3, 2011 for U.S. Appl. No. 12/255,632, filed Oct. 21, 2008; pp. 1-5.

PCT "International Search Report and Written Opinion of the International Searching Authority for PCT/US2013/027166", mailed on Jun. 19, 2013; received on Jun. 21, 2013.

PCT International Preliminary Report on Patentability for PCT/US2011/049182; Mailed on Mar. 7, 2013; pp. 1-9.

PCT, "International Search Report and Written Opinion of the International Searching Authority for PCT/US2011/049182", mailed on Dec. 23, 2011.

Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.

PagerDuty, available at http://www.pagerduty.com, retrieved on Sep. 14, 2011, published on Jun. 6, 2009, 23 pages.

Prey, available at http://preyproject.com/, retrieved Jan. 10, 2012, published on May 16, 2009, 4 pages.

Qualys, "Executive Dashboard," Internet Archive, Way back Machine, available at <http://web.archive.org/web20080507161417/www.qualys.com/products/screens/?screen=Executive + Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 pages.

Reardon, Marguerite, "Mobile Phones That Track Your Buddies," CNET, available at <http://news.cnet.com/Mobile-phones-that-track-your-buddies/2100-1039_3-6135209.html, retrieved Mar. 30, 2012, published on Nov. 14, 2006, 6 pages.

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

Sprint Nextel, Mobile Locator, Internet Archive, Way Back Machine, available at http://web.archive.org/ web/20080901070835/http://www.nextel.com/en/solutions/gps/mobile_locator.html, 2 pages, Retrieved Jan. 16, 2013.

Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

(56) References Cited

OTHER PUBLICATIONS

Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.
TrendMicro SmartPhone Protection Network http://us.trendmicro.com/imperia/md/content/us/trendwatch/ coretechnologies/smartprotectionnetwork_whitepaper.pdf.
Trillian, available at http://www.trillian.im/, retrieved on Sep. 14, 2011, published on Oct. 11, 2007, 24 pages.
U.S. Appl. No. 12/255,635. Prosecution history available via USPTO IFW (including Office Action dated Mar. 24, 2011 and references cited.)
U.S. Appl. No. 12/255,626. Prosecution history available via USPTO IFW (including Office Action dated Feb. 1, 2011 and references cited.)
U.S. Appl. No. 12/255,621. Prosecution history available via USPTO IFW (including Office Action dated Apr. 13, 2011 and references cited.)
U.S. Appl. No. 13/160,447. Prosecution history available via USPTO IFW.
U.S. Appl. No. 12/255,632. Prosecution history available via USPTO IFW (including Notice of Allowance dated Nov. 3, 2011 and references cited).
U.S. Appl. No. 12/255,614; Prosecution history available via USPTO IFW (including OA dated Apr. 14, 2011).
Virus Total, VT Community, www.virustotal.com/index.html; Dated Dec. 16, 2011; 44 Pages.
Windows Update, Internet Archive, Way Back Machine, available at <http://web.archive.org/web/20071022193017/http://en.wikipedia.org/wiki/Windows_Update> Retrieved Feb. 23, 2011, 3 pages.
"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview," available at http://us.blackberry.com/developers/platform/pushapi.jsp#tab_tab_resources, retrieved on Sep. 14, 2011, published on Nov. 6, 2010, 21 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.
"Pidgin the Universal Chat Client," Pidign, available at http://www.pidgin.im/, retrieved Sep. 14, 2011, published on May 1, 2007, 14 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"zVeloDB URL Database," zVelo, available at https://zvelo.com/technology/zvelodb-url-database, retrieved Mar. 30, 2012, published on Jan. 21, 2012, 2 pages.
McAfee Artemis Technology—Always-On, Real-Time Protection, 2008.
McAfee Knowledge Base Corporate KB60224, last modified on Jan. 19, 2010.
McAfee Technical Brief zero day to real time, 2008.
Norton Insight A solution to Performance, published on Aug. 29, 2008.
TippingPoint "TippingPoint Security Management System (SMS)", published on Mar. 31, 2005, 2 pages.
TrendMicro SmartPhone Protection Network, dated Jun. 2008.
Comodo Group, Inc. website history page using wayback machine, "Digital Code Signing, Code Signing Certificates—Comodo", May 11, 2013, p. 1-6.
Expressing Intent to Control Behavior of Application Components, U.S. Appl. No. 13/786,210, filed Mar. 5, 2013, Timothy Wyatt, et al, Final Rejection Mailed, Sep. 23, 2013.
Component Analysis of Software Applications on Computing Device, U.S. Appl. No. 13/692,806, filed Dec. 3, 2012, Timothy Wyatt, et al, Non Final Action Mailed, Aug. 13, 2013.
Assessing Application Authenticity and Performing an Action in Response to an Evaluation Result, U.S. Appl. No. 14/105,950, filed on Dec. 13, 2013, Kevin Mahaffey, et al, Docketed New Case—Ready for Examination, Jun. 20, 2014.
Monitoring Installed Applications on User Devices, U.S. Appl. No. 14/253,702, filed Apr. 15, 2014, Kevin Mahaffey, et al, Docketed New Case—Ready for Examination, Jun. 27, 2014
Identifying Manner of Usage for Software Assets in Applications on User Devices, U.S. Appl. No. 14/253,739, filed Apr. 15, 2014, Kevin Mahaffey, et al, Docketed New Case—Ready for Examination, Jun. 27, 2014.
Monitoring for Fraudulent or Harmful Behavior in Applications Being Installed on User Devices, U.S. Appl. No. 14/301,007, filed Jun. 10, 2014, Kevin Mahaffey, et al, Application Dispatched from Preexam, Not Yet Docketed, Jul. 3, 2014.
Crawling Multiple Markets and Correlating, U.S. Appl. No. 13/484,132, filed May 30, 2012, Timothy Wyatt, et al, Response to Non-Final Office Action Entered and Fowarded to Examiner, Sep. 16, 2014.
Gianluigi Caldiera et al.; Identifying and Qualifying Reusable Software Components; 1991 IEEE; pp. 61-70; <http://ieeexplore.ieee.org/stamp/stamp.jsp?tp=&arnumber=67210>.
J. S. Poulin et al.; The business case for software reuse; 1993 IBM; pp. 567-594; <http://ieeexplore.ieee.org/stamp/stamp.jsp?tp=&arnumber=5387336>.
Jan Bosch; Maturity and Evolution in Software Product Lines Approaches, Artefacts and Organization; 2002 Springer; pp. 257-271; <http://link.springer.com/chapter/10.1007/3-540-45652-X_16>.
Richard Lippmann et al.; The Effect of Identifying Vulnerabilities and Patching Software on the Utility of Network Intrusion Detection; 2002 Springer; pp. 307-326; <http://link.springer.com/chapter/10.1007/3-540-36084-0_17>.
Wendy Roll; Towards Model-Based and CCM-Based Applications for Real-Time Systems; 2003 IEEE; 8 pages; <http://ieeexplore.ieee.org/stamp/stamp/jsp?tp=&arnumber=1199238>.
Ivica Crnkovic et al.; A Classification Framework for Software Component Models; 2011 IEEE; pp. 593-615; <http://ieeexploreieee.org/stamp/stamp.jsp?tp=&arnumber=5587419>.

* cited by examiner

USER CLASSIFICATION BASED ON DATA GATHERED FROM A COMPUTING DEVICE

FIELD OF THE TECHNOLOGY

At least some embodiments disclosed herein relate to user classification in general, and more particularly, but not limited to, classification of a user based on data gathered from a computing device (e.g., a computing device of the user or a server in communication with a user's computing device).

BACKGROUND

One common type of computing device is a mobile device such as an iPhone device. Mobile devices have evolved beyond simple telephone functionality and are now more complex multi-functional devices. In addition to voice communications, many mobile devices are capable of text messaging, email communications, Internet access, and the ability to run full-featured application software. For example, mobile devices can use these capabilities to perform online transactions. Furthermore, mobile devices used by an individual or a business often store information in many forms such as electronic documents, text messages, etc. Users may be presented with advertisements or other product information when using the mobile device.

Applications that run on the mobile device may, for example, be downloaded and installed from an application marketplace. An example of an application marketplace is the Google Play service. Some of these applications may present varying advertisements to the user during execution.

Also, advertisements may be presented to a user of a computing device when accessing a website to shop for goods or services (e.g., when using a web browser on the computing device). For example, a user accessing the Amazon.com website may be presented with a number of recommended products for potential purchase (i.e., products selected by the website for interest by a particular customer).

SUMMARY OF THE DESCRIPTION

Systems and methods for classification of a user based on data gathered from a computing device of the user are described herein. Some embodiments are summarized in this section.

In one embodiment, data regarding one or more user actions on a user device (e.g., data regarding actions taken by the user during actual usage of the device such as user settings selected by the user and/or interactions by the user with a user interface of an application installed on the device) is gathered from the user device by a server. The data is analyzed to make a decision. The decision is sent by the server to the user device and then used by the user device to implement a new action on the user device (e.g., the action may be the changing of a setting on the device, the sending of an email from the device, or the changing of a page presented on a user display of the device).

In some cases, the decision is simply the selection of the new action by the server, which is then communicated to the user computing device for implementation of the new action (e.g., the changing of a user interface screen on the user computing device in order to present additional, advanced user options, and/or the changing of the functionality or logic of an application on the user device in order to customize the application for an advanced user).

In one example, the new action may be implemented automatically by the user device after receipt of the decision. In a different example, a score is sent to the user device with the decision. Implementation of the new action is based on the score, and the decision to implement is made at the user device.

In another example, the gathered data is used to classify the user into one of several different user categories stored at the server. A new action from the selected category is sent to the user device for implementation. The new action may be automatically implemented by the user device, or the decision whether to implement the new action may be made at the user device.

In one embodiment, decision making is based on data gathered at a computing device and sent to the server as part of a single communication or session with the server (i.e., it is only the data gathered in this one activity that is used to make the decision). In another embodiment, previously-gathered data is retained on the server, and there are one or several additional cycles of newly gathering of data. The prior and new gathered data are analyzed to make a decision. For example, in some cases an isolated occurrence itself on the mobile device may be an insufficient basis for changing a user category. Instead, a repeated pattern of behavior (e.g., detected using newly-gathered data and also previously-gathered data) is used to make the decision.

In another embodiment, a method includes: receiving data gathered by an application on a computing device of a user, wherein the gathered data comprises a plurality of user actions performed by the user on the computing device; analyzing, by at least one processor, the gathered data to provide an output decision and a score; and sending the output decision and the score to the computing device, wherein a local decision will be made by the computing device, based on the score (e.g., whether the score is greater than a predetermined threshold value), whether to implement a first action on the computing device, and wherein the first action corresponds to the output decision. In one example, a set of threshold values may be stored locally on the user device. In an alternative embodiment, these values are stored at the server, and the decision to implement an action is made at the server based on these values.

In one embodiment, a system includes: a data repository storing a plurality of user categories including a first user category, and further storing a first action associated with the first user category; at least one processor; and memory storing instructions configured to instruct the at least one processor to: receive data gathered by an application on a computing device of a user, wherein the gathered data comprises at least one user action performed by the user; analyze the gathered data to classify the user into the first user category; and in response to classifying the user into the first user category, send the first action for implementation on the computing device.

In one embodiment, a decision is made, but the first action is not sent immediately for implementation on the computing device. Instead, the decision is queued or scheduled for transmission at a later time. This may include instances in which the action involved is something that would desirably be performed at a different time or in a different situation from the present situation (e.g., during the night when the user is not using the device actively, or when there is higher bandwidth available, or more power available, or other circumstances). In some cases, the category itself is sent to the device (rather than the action), and the device will take action based on the received category.

In another embodiment, a computer-readable storage medium stores computer-readable instructions, which when executed, cause a computing device of a user to: gather data on the computing device, wherein the gathered data comprises at least one user action performed by the user; send the gathered data to a server configured to classify, based on analysis of the gathered data, the user into a first user category of a plurality of user categories stored at the server in a data repository, wherein the data repository includes at least one action corresponding to the first user category; receive, from the server, the at least one action; and implement the at least one action on the computing device. The data may be gathered by an application (or other type of software) that is executing on the user computing device (e.g., the application may have been previously downloaded from an application marketplace).

In one case, an operating system provider can build the above data gathering capability into the operating system itself as an integral component. In another case, the user computing device may contain a virtualization solution (e.g., a virtual machine in which runs the operating system, in which run the applications). In this case, the data gathering component may be implemented within the virtualization solution or machine as a component.

In one embodiment, some of the above classification activities are performed on the user computing device itself. For example, some simple user classification decisions may be easily and/or economically available within an application on the user computing device (and not require recourse to a server). Also, in some cases, a subset of a data repository can be available on a user computing device itself (e.g., in addition to being available on the server). In some cases, all analysis and processing is done on the user computing device. In other cases, different types of information can be sent to the server so as to obtain optionality when it is time to implement a decision on the device. Various examples are as follows: gather data on device, send data to server to be analyzed, receive action on device; gather data on device, analyze data on device, send category to server; receive action on device; etc.

In yet other embodiments, the decision can be sent to a server or other computing device instead of the user computing device. The action taken is taken by the server (e.g., based on the decision and score that it may receive). For example, the server sends an email at an appropriate or correct time based on user actions (e.g., data is gathered from the user actions and used to make a decision that leads to sending the email).

The disclosure includes methods and apparatuses which perform the above methods and systems, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
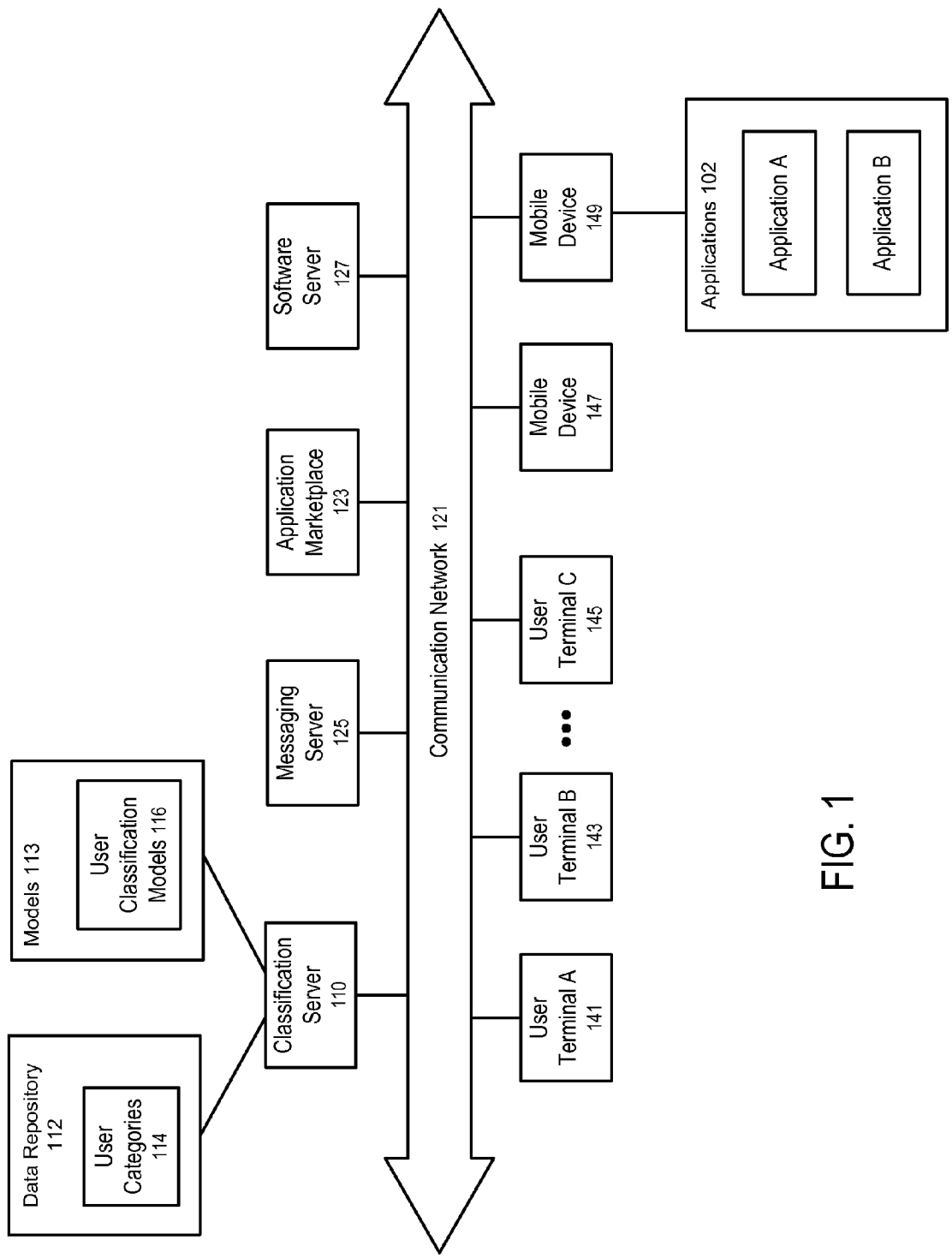
FIG. 1 shows a system for classification of a user of a computing device based on data gathered from the computing device (e.g., a user terminal or a mobile device) that communicates with a classification server, according to one embodiment.

FIG. 1 shows a system for classification of a user of a computing device (e.g., a user terminal or a mobile device) based on data gathered from the computing device (e.g., the gathered data may be data regarding a user's actual usage of a mobile device and/or a product or application on the device). The data is gathered by communication between the computing device and a classification server 110 that collects the data for analysis, according to one embodiment. Examples of mobile devices include cell phones, smartphones, and tablet devices such as the iPhone device or an Android tablet. Examples of user terminals include any device with which a user interacts such as desktops, laptops, refrigerators, cars or other vehicles with embedded computers, toasters and other appliances. In yet other embodiments, the methods as described herein may extend to taking action on devices that operate in the absence of a user (either temporarily or during all modes of operation) such as, for example, un-attended computing devices, sensor platforms, remote autonomous vehicles or computing devices or machinery, manufacturing facilities, etc.

In FIG. 1, user terminals (e.g., 141, 143, . . . , 145) and/or mobile devices 147, 149 are used to access and/or communicate with one or more of classification server 110, application marketplace 123 (e.g., an Android or Google Play marketplace), and/or messaging server 125 (e.g., an email server) over a communication network 121 (e.g., the Internet, a wide area network, or other wired or wireless communications network). As mentioned above, each of the user terminals (141, 143, . . . , 145) and mobile devices 147, 149 may communicate with classification server 110 to send gathered data regarding user actions for each respective device to classification server 110.

A data repository 112 (stored on or accessible by classification server 110) stores a plurality of user categories 114 (e.g., including basic, intermediate, and advanced user categories). Data repository 112 further stores one or more actions associated with each of the user categories 114.

Each action is a function or event that will be performed or caused to occur on the user's computing device. Data gathered from a computing device, such as mobile device 149, is sent to classification server 110 and analyzed to select a user category, for example, corresponding to the real-time, or substantially real-time, operation of the mobile device by the user. It should be noted that in other cases, real-time operation is not necessary. Also, in some cases the accumulated information that is analyzed is gathered over time (e.g., gathered at several different times). The accumulated data is used to update a user category based on real-time data as well as historical data.

As an example, an action may be sent to the mobile device less than 5 seconds after receiving data gathered from the mobile device that was analyzed in order to determine the action. In various examples, the time period may be even shorter, such as 1 second, 100 milliseconds, or even 10 milliseconds.

Classification server 110 stores various models 113 that may be used to analyze data gathered from mobile device 149. Applications 102 (e.g., Application A or Application B) have been previously installed on mobile device 149. An application (e.g., Application A) gathers data regarding user actions from mobile device 149. The application or mobile device 149 sends the data to classification server 110. Classification server 110 analyzes the gathered data to classify the user into one of the user categories 114 (e.g., these categories may include a basic user category and an advanced user category). One or more models 113 are used during this analysis. In one embodiment, models 113 includes user classification models 116 that are used in the analysis. After the user is classified into a particular user category (e.g., an advanced user category), at least one action corresponding to the selected user category is sent for implementation on mobile device 149.

In one embodiment, the data is gathered from a plurality of applications (i.e., not merely from a single application) and is used to make the decision. In some cases, the data gathered from one application is used to make a decision regarding a different application.

In one embodiment, user classification/user categories may be either dependent on or independent from specific applications. For example, a user may have a single classification of "expertUser", or the user could be a "noviceUser" for application A and an "expertUser" for application B. The user classification may be application specific, or may apply to two or more applications associated with the user.

In one embodiment, user classifications/categories can be used across devices. For example, the user may have a tablet and a smartphone. The user is classified as an "expertUser" on the smartphone. That user classification may be used for the user's tablet, and the user be designated as an "expertUser" on the tablet. The decision making process for the tablet may at least include the user's classifications/categories on other devices of the user.

In one embodiment, data gathered from a device can be joined with data gathered from other sources for use in decision making or user classification. For example, such data from other sources may include network traffic information for the user gathered at a network gateway, information about the user from a security event correlation system, data from a social network, data from a bank, and/or data from a personal computer or other devices of the user.

Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, . . . , 145) and mobile devices 147, 149. The applications available for installation from marketplace 123 may each be configured to send data to classification server 110, and optionally to communicate the same or other data to software server 127. Further, each such available application may be configured to use messaging server 125 for messages to or from the user of a computing device. It should be noted that applications need not be obtained from marketplace 123. In other cases, applications or other software may be obtained from any source. Examples include applications that are pre-loaded on a device, applications that are pushed to the device by a device management solution, and applications that are installed/loaded via other means.

In one example, an owner of an Android phone (e.g., mobile device 147) may visit a web site hosted by marketplace 123 and select a free poker game application for remote installation on mobile device 147. The user may authenticate itself to marketplace 123 by its email address (e.g., Gmail address) and password. The poker game application may send data to classification server 110, which may use this gathered data to adjust or customize the operation of the poker game application (in response to actions received from classification server 110). These actions may change the difficulty level of play, change the number of options presented for selection by the user, and/or change the user interface displays. Also, betting limits may be adjusted in real-time for the user based on a user category selected by classification server 110 using a model 116. The software code necessary to provide the changed user device operation may be previously stored on the user device, or may be sent from classification server 110 (or from a server pointed to by a link from server 110), for example, with or after sending the action.

The marketplace 123 and/or messaging server 125 are connected to respective data storage facilities to store applications, messaging account data for users, user preference data, and other data. In FIG. 1, messaging server 125 is connected to communication network 121 to deliver messages (e.g., email or text) to user terminals 141-145 or one of a user's mobile devices 147, 149.

In one embodiment, a software server 127 is coupled to communicate with application marketplace 123 and/or mobile devices 147, 149 by communication network 121. Server 127 stores, for example, an application in memory, and sends the application to application marketplace 123 for later download and installation by a user onto, for example, mobile device 147. In another embodiment, software server 127 is a developer computer, or another computer, used to upload an application to marketplace 123.

In one embodiment, server 127 communicates with the application (now executing on mobile device 149 after installation by the user). The application is configured to gather data from mobile device 149 and send data to classification server 110 (and optionally to communicate with software server 127). In one embodiment, mobile device 149 includes applications 102 that have been previously installed on mobile device 149. Applications 102 may be installed from application marketplace 123 or software server 127.

Although FIG. 1 illustrates an exemplary system implemented in client-server architecture, embodiments of the disclosure can be implemented in various alternative architectures. For example, the classification server 110 or application marketplace 123 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 2:
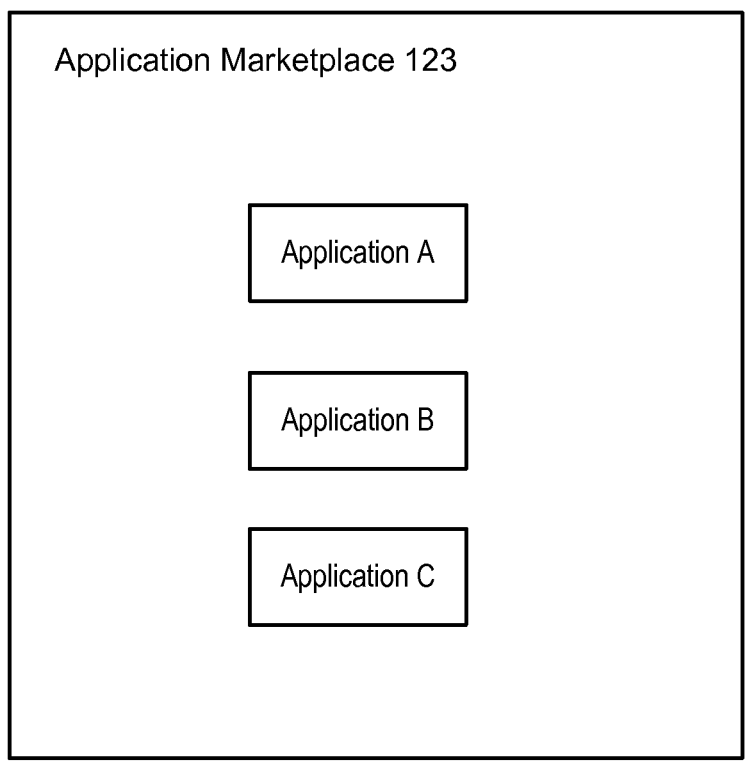
FIG. 2 shows an application marketplace offering multiple applications for remote installation on mobile devices, according to one embodiment.

FIG. 2 shows a web page of application marketplace 123 (e.g., the Google Play service) offering multiple applications (A, B, C) for remote installation on mobile devices, according to one embodiment. A user accesses the web page (e.g., over network 121) and selects an application for remote installation. The user may pay for the application on a web page provided by marketplace 123 (unless the application is free of charge).

Figure 3:
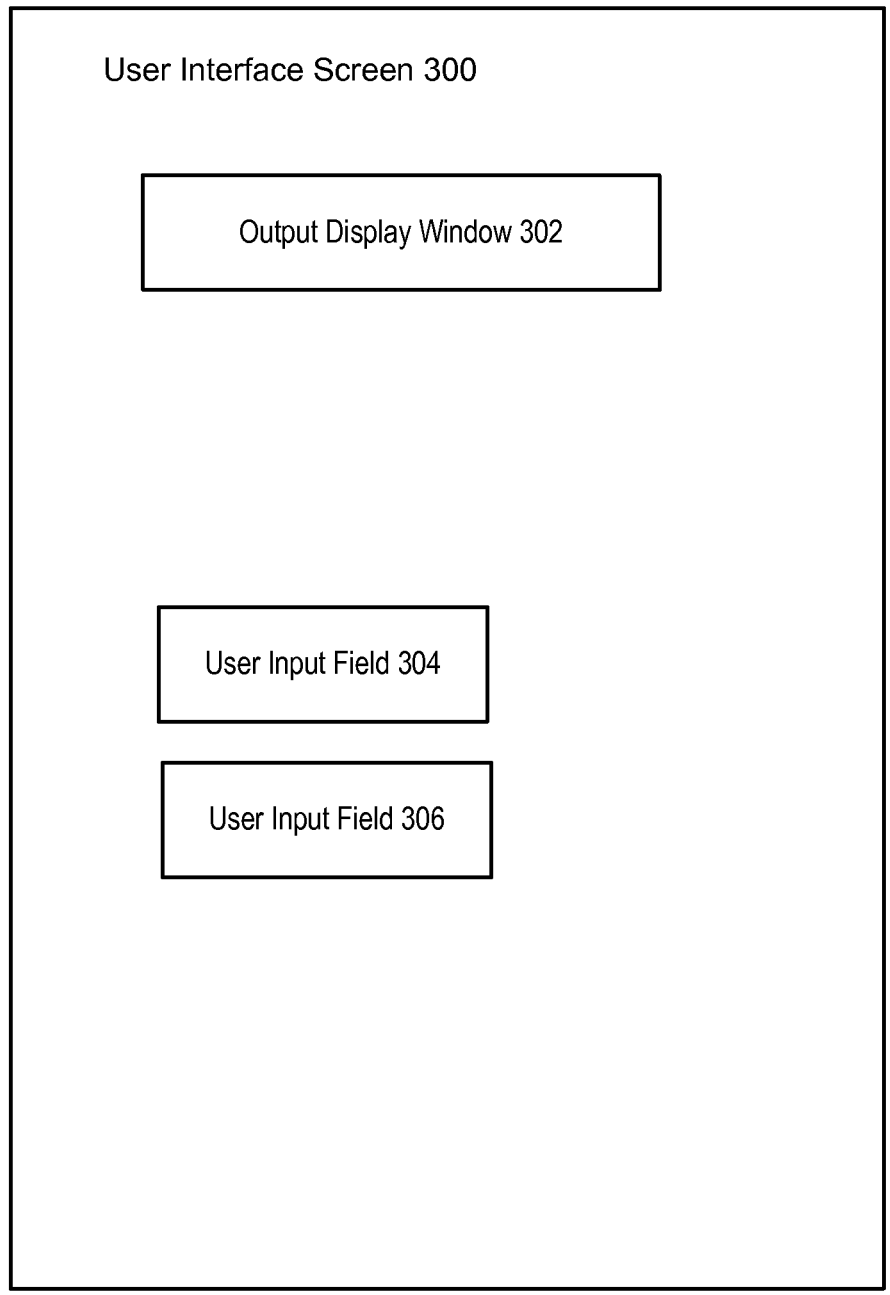
FIG. 3 shows a user interface screen presented by an application on a display of a mobile device to a basic user, according to one embodiment.

FIG. 3 shows a user interface screen 300 presented by an application 102 on a display of a mobile device 149 to a basic user, according to one embodiment. In this embodiment, the user of mobile device 149 may have previously been classified as a basic user. Alternatively, application 102 may be installed with a configuration that corresponds to a basic user category until data gathered from mobile device 149 is analyzed to determine that the user more appropriately belongs in, or is a better match to, a different user category 114 such as for an advanced user.

In one embodiment, as regards the breadth and persistence of user categories: if a particular user has already been categorized as an advanced user for other applications, a new application may be automatically delivered to the user's mobile device. The new application is set up or configured assuming that the user is an advanced user.

In one embodiment, application marketplace 123 gathers data (e.g., a download of history) and analyzes it (locally or on a server) to produce user characteristics (e.g., a category for the user). Applications downloaded via marketplace 123 access the user characteristics (e.g., an environment variable, provided by an API in the marketplace application).

In one embodiment, an advertising component, on the device (or the device and a server) gathers data and characterizes the user. Device applications request user characteristics from the advertising component. The user can manually disable or update characteristics in the advertising component (e.g., via a mobile application or a web site).

User interface screen 300 includes an output display window 302, user input field 304, and user input field 306. Output display window 302 may present a certain type of data associated with operation of an application 102. Input fields 304 and 306 may receive selections by the user using a touch screen interface or mouse, as examples, in order to input data or make a user selection.

Figure 4:
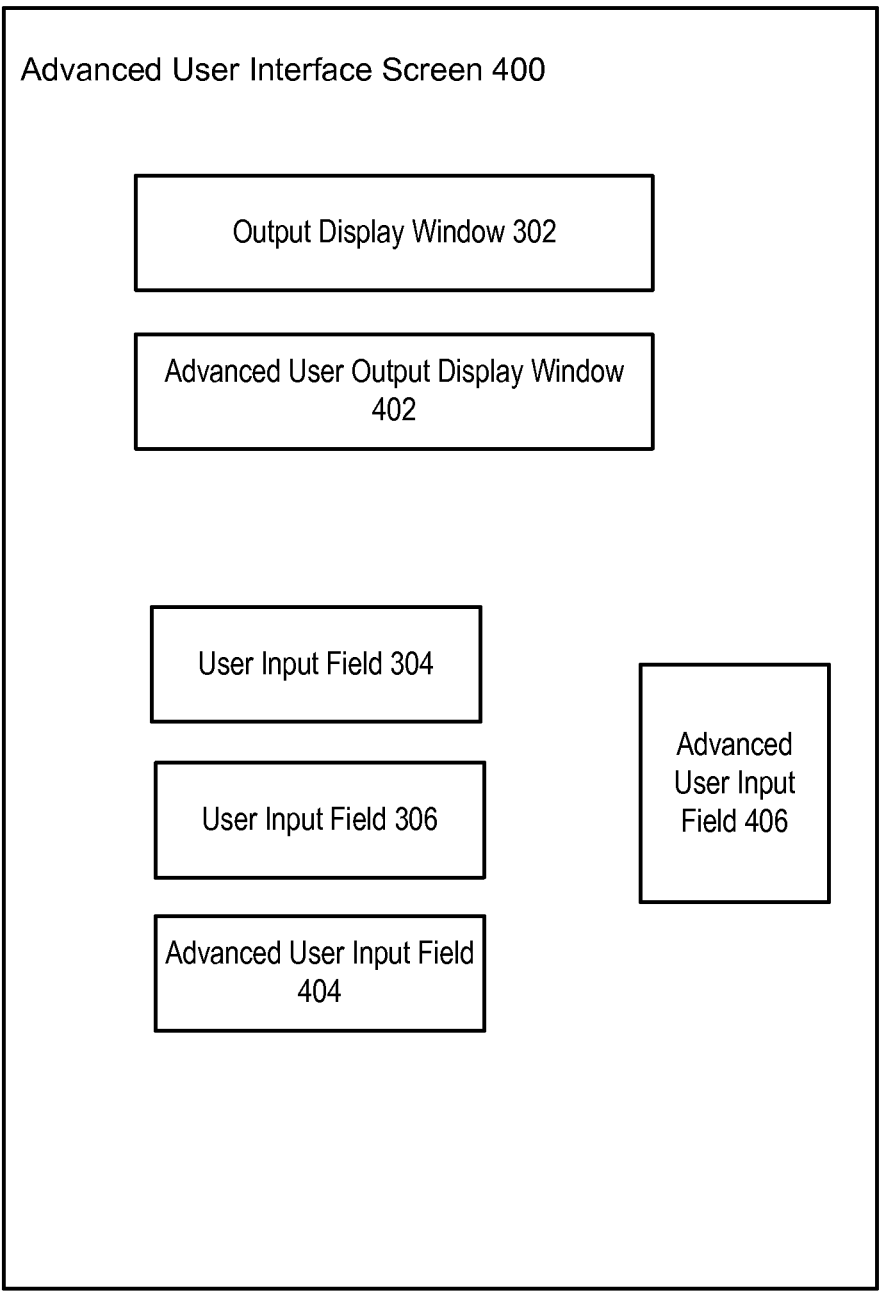
FIG. 4 shows the user interface screen presented by the installed application of FIG. 3 after changing of the screen based on classification of the user into an advanced user classification, according to one embodiment.

FIG. 4 shows a user interface screen 400 presented by the installed application of FIG. 3 after changing of the previously-displayed screen 300 based on classification of the user into an advanced user classification, according to one embodiment. More specifically, mobile device 149 has received one or more actions from classification server 110. Based on these actions, the operation of application 102 is changed so that a new advanced user output display window 402 is displayed to the user. Also, based on this same action, or on a different action received from classification server 110, advanced user input fields 404 and 406 are added to the user interface.

As described herein, a user interface may be initially kept simple for basic users, but by being able to detect that users are (or have become through experience) more advanced, decisions are made based on their actions to classify them as advanced users. In an alternative embodiment, an initially-classified advanced user may be later classified as a basic user. More specifically, based on a prior time period (e.g., the last six months of activity) it may be observed that a user is behaving like a basic user. In such a case, the user can be reclassified back to a basic user, and the user interface may be modified appropriately. Also, applications may be delivered assuming users are advanced. Then, by gathering data and making decisions, the users may be reclassified into basic users. In one example, the time period is used to help make a decision (e.g., no advanced-user related actions occurred in the last six months) so a reclassification decision is being made based on the age of the previously-gathered data and the absence of any additional new/recent gathered data.

Additional information regarding various non-limiting examples of mobile devices and their usage more generally, including the presenting of information regarding a mobile device to a user, is described in previously-published U.S. Patent Application No. 2011/0047033 A1, published Feb. 24, 2011, entitled "SYSTEM AND METHOD FOR MOBILE DEVICE REPLACEMENT," by Mahaffey et al., the entire contents of which application is incorporated by reference as if fully set forth herein.

In one embodiment, there are various ways to identify characteristics that are actually present in an application. For example, U.S. Patent Application Publication No. 2011/0047597, published on Feb. 24, 2011, and titled "System and Method for Security Data Collection and Analysis", by Mahaffey et al., which is incorporated by reference as if fully set forth herein, provides a general discussion about the gathering of information from an application on a mobile device for further processing at a server. According to this embodiment, information that has been gathered as described by Mahaffey et al. in U.S. Patent Application Publication No. 2011/0047597 may be used for classification analysis at classification server 110 in order to select a user category as described above. In another embodiment, behavioral data may be determined or collected using other approaches. For example, data may be gathered based on network traffic (e.g., SMS, IP) data associated with the user computing device.

Figure 5:
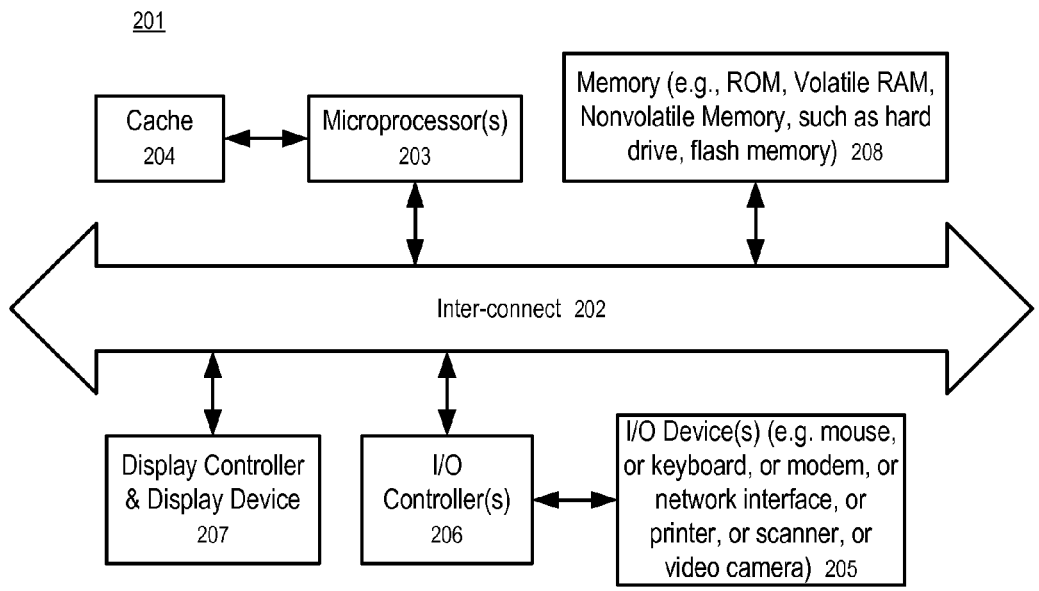
FIG. 5 shows a block diagram of a data processing system (e.g., a classification server) which can be used in various embodiments.

FIG. 5 shows a block diagram of a data processing system (e.g., a classification server 110, a messaging server 125, application marketplace 123, or software server 127) which can be used in various embodiments. While FIG. 5 illustrates various components of a computer system, it is not intended to represent any particular architecture or manner of interconnecting the components. Other systems that have fewer or more components may also be used.

In FIG. 5, the system 201 includes an inter-connect 202 (e.g., bus and system core logic), which interconnects a microprocessor(s) 203 and memory 208. The microprocessor 203 is coupled to cache memory 204 in the example of FIG. 5.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 5 is used to implement classification server 110, application marketplace 123, messaging server 125, and/or other servers. In another embodiment, a data processing system as illustrated in FIG. 5 is used to implement a user terminal, a mobile device, or another computing device on which an application is installed. A user terminal may be in the form, for example, of a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 6:
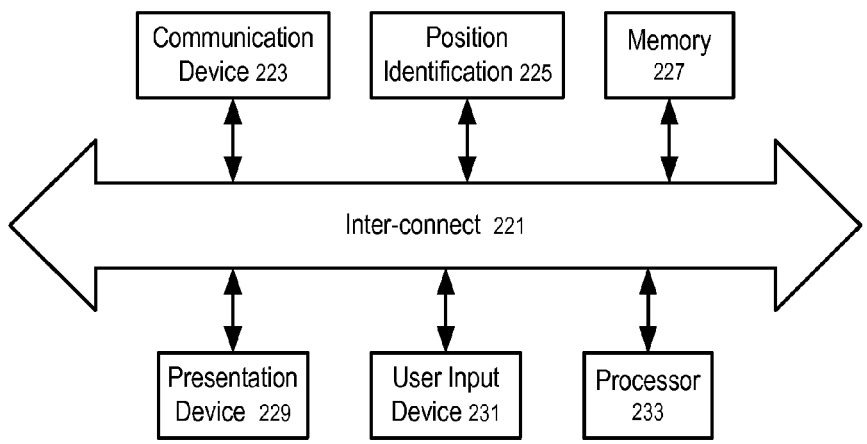
FIG. 6 shows a block diagram of a user device (e.g., a mobile device), according to one embodiment.

FIG. 6 shows a block diagram of a user device (e.g., a mobile device or user terminal) according to one embodiment. In FIG. 6, the user device includes an inter-connect 221 connecting the presentation device 229 (e.g., a touch screen or other form of display), user input device 231, a processor 233, a memory 227, a position identification unit 225 and a communication device 223.

In FIG. 6, the position identification unit 225 is used to identify a geographic location. The position identification unit 225 may include a satellite positioning system receiver, such as a Global Positioning System (GPS) receiver, to automatically identify the current position of the user device. This data may be part of the data gathered by the classification server 110.

In some embodiments, the user classification/categorization can be contextual. For example, in certain locations or during certain contextual activities, a user can be considered a basic user, while in other contexts a user is treated as an advanced user. The use of context in making decisions, and switching between different user categories contextually may be advantageous in some implementations. The data gathered for making user classification decisions can include data regarding the user's context such as, for example, location, battery life, Wi-Fi related data and characteristics, etc.

In one embodiment, categorization can be extended to use conditional categorization. More specifically, if a given event or item happens, then a user is given a first classification; if a different given event or item happens, then the user is given a second classification. The device may receive the conditional categorizations from the classification server. In some cases, the server may send a classification or other model to a computing device that takes or receives input (e.g., input from actions or other data on the device) and produces a categorization. The model may be created or selected based on analysis of gathered data on the server.

In FIG. 6, the communication device 223 is configured to communicate with a network server to provide data, including location data. In one embodiment, the user input device 231 is configured to receive or generate user data or content. The user input device 231 may include a text input device, a still image camera, a video camera, and/or a sound recorder, etc.

Various further embodiments are now described below. In one embodiment, a method includes: receiving data gathered by software (e.g., application 102 or another application) on a computing device (e.g., mobile device 147, 149) of a user, wherein the gathered data comprises a plurality of user actions (e.g., touching on a certain application selection option) performed by the user on the computing device; analyzing, by at least one processor (e.g., on classification server 110), the gathered data to provide an output decision and a score; and sending the output decision and the score to the computing device, wherein a local decision will be made by the computing device, based on the score, whether to implement a first action on the computing device, and wherein the first action corresponds to the output decision.

The output decision may be a determination that the user is in a first user category (e.g., an advanced user category) of a plurality of user categories (e.g., categories 114), and the first action is a function to be implemented by the application for users in the first user category. The function may be stored on the computing device prior to the gathering of the data by the application. The sending may include sending the function to the computing device. The sending the output decision and the score may be performed less than 5 seconds after the receiving data gathered by the application.

In one embodiment, the output decision is a first output decision, and the method further comprises: receiving additional data gathered by the application on the computing device, wherein the additional data comprises at least one user action performed by the user on the computing device; analyzing the gathered data to provide a second output decision; and sending the second output decision to the computing device for implementing a second action on the computing device.

In one embodiment, a system includes: a data repository (e.g., data repository 112) storing a plurality of user categories including a first user category, and further storing a first action associated with the first user category; at least one processor; and memory storing instructions configured to instruct the at least one processor to: receive data gathered by an application on a computing device of a user, wherein the gathered data comprises at least one user action performed by the user; analyze the gathered data to classify the user into the first user category; and in response to classifying the user into the first user category, send the first action for implementation on the computing device.

The instructions may be further configured to instruct the at least one processor to determine a score associated with the first user category. The score may be a probability value or a confidence value. The sending of the first action may be conditional on the score being greater than a threshold value. The implementation of the first action on the computing device may be conditional on the score being greater than a threshold value. The analyzing of the gathered data may include using a user classification model (e.g., one or more of models 116) to classify the user into the first user category.

The instructions may be further configured to instruct the at least one processor to: receive a selection from the user to adjust the user classification model, the selection provided by the user on a user interface of the computing device; and adjust the user classification model based on the selection.

In one embodiment, a non-transitory computer-readable storage medium stores computer-readable instructions, which when executed, cause a computing device of a user to: gather, via at least one processor, data on the computing device, wherein the gathered data comprises at least one user action performed by the user; send the gathered data to a server configured to classify, based on analysis of the gathered data, the user into a first user category of a plurality of user categories stored at the server in a data repository, wherein the data repository includes at least one action corresponding to the first user category; receive, from the server, the at least one action; and implement, via the at least one processor, the at least one action on the computing device.

The instructions may further cause the computing device to present, on a display of the computing device, a user interface to the user, the user interface comprising a first user interface element. The implementing of the at least one action may include updating the user interface. The updating of the user interface may include adding a second user interface element.

In one embodiment, the first user interface element is a first user input field, and the second user interface element is a second user input field. The gathering data on the computing device may include gathering data associated with a user action performed by the user via the user interface. The data may be gathered by an application (e.g., application 102) running on the computing device, and the gathering data may begin after a predetermined time period from installation of the application on the computing device.

Additional exemplary, non-limiting details regarding various implementations of the above embodiments are now described here below. In one example, classification server 110 takes in a large corpus of data on a real-time basis (e.g., by the millisecond). A model 113 processes this data and then synthesizes it into product actions (e.g., to be implemented on mobile device 149).

The gathered data may include data on user behavior. For example, such data may include user settings, the user action of uploading a picture, or the manner in which a user interacts with a user interface. A product experience (e.g., for a user interacting with an application 102) is customized based on that user interaction. The gathered data may include the features that a user uses on application 102, and also how long the user uses a given feature. For example, the data may include time spent by a user in a web layer (e.g., if the user visits and logs onto a website). In another example, the data may include whether the user visits a website to locate the user's lost phone. Other data may include options and preferences the user has set for herself on the user's device (e.g., a setting to back-up contacts weekly and the locating of the user's phone daily).

There can be multiple segments or categories of users that interact with or use an application (e.g., an inexperienced user category, and a technically-proficient user category). Both types of users are using the same installed application. Based on the data gathered or collected, classification server 110 can determine whether the user is a technical or a non-technical user (without the user having to explicitly provide that information to server 110, or to the user's computing device).

A technical user is more likely to go into the settings screen and set different options. So, when an email is sent to a technical user, describing how the user can use the product (e.g., one of applications 102), the content of the email is more technical in nature, as opposed to simpler content in an email for a non-technical user. This analysis and selecting of an action to implement (i.e., the sending of this email) is done in real-time (i.e., the user experiences real-time changes and/or events).

There can be a large number of user categories 114 (e.g., tens or hundreds of categories). For example, there might be 12 user categories. Gathered data may also include data that does not change frequently such as user characteristics (e.g., what phone a user has, the carrier used, etc.). Gathered data may also include demographic data.

In another example, actions sent to the user computing device permit customizing of the user experience in real-time based on how the user actually is using an application 102. Showing an advanced setting screen instead of a basic setting screen by default is an example of a different user experience. Making automated changes to the functionality of an application is another example of customizing of the user experience (e.g., customizing how an application functions on a user device based on the gathered data and user classification).

In one example, the user classification process described above is implemented as an automated, continuous feedback loop. Mathematical parameters are set for one or more models 113, and the models operate as user data is received. As more feedback (gathered data) is received from users, the user experience is increasingly tailored to each user. A model may update itself on the order of seconds or even milliseconds, and after updating, the model will redeploy.

In one example, the users themselves can change the output decision mapping used by classification server 110. For example, each user may indicate actions that the user likes or does not like (so that functions or future actions may be changed). New actions may be received from classification server 110 that consider these user likes and dislikes, or other user selection of model parameters (even as may be stored on and received from another server, such as server 127).

Some examples of tools that may be used to collect data are now discussed. From the client side (e.g., from one or more applications on a user's phone), data may be collected by an application regarding behavioral statistics (e.g., time spent using a feature and options that are set by the user). This data is sent to classification server 110 for analysis and classification as discussed above. Based on this analysis and a determination of a non-technical user category being applicable to the user, an action may be sent (e.g., in order to set user backups of the user device to occur every month).

In one embodiment, classification server 110 can assign probabilities for each user category (e.g., one category is an advanced user, another category is an infrequent user, and yet another category is a non-technical user). For example, server 110 might determine based on a score such as a probability value (e.g., that it is 80% assured) that the most appropriate user category is an advanced user category. The choosing of the score (e.g., a probability value) may be done through mathematical modeling (e.g., use of statistical techniques). Models 113 are used to turn behavioral characteristics and statistics into probabilistic scores (e.g., using machine-learning techniques). The models 113 may be created by machine-learning techniques. Once one or more models 113 process gathered data, the outputs from the model(s) are a set of probabilities. Classification server 110 assigns each of these probabilities to a user category 114. In one embodiment, an output of this modeling and analysis is an action as discussed above. Examples of actions include a change to a setting, a sending of an email, a changing of a page, a presenting to the user of an offer for purchase of a good or service, etc. Examples of machine-learning techniques and models include: neural networks, support vector machines, random forests, adaptive standard additive model fuzzy systems, and deep belief networks.

In one embodiment, classification server 110 can use defined thresholds, such that if a user clears a given threshold value (e.g., a user having a score of 80 on a zero to 100 score, with a threshold value being 70 for a given user category), then classification server 110 knows with a statistical confidence that the user is in this user category. This information will then be injected back into the model for future analysis done when new gathered data is received.

After a user is assigned to a user category, that assignment becomes part of the feedback loop discussed above. From that point on, if the user performs user actions on a user device that are contrary to the user category that has been defined or associated with that user, then these usage statistics and data will be brought into the model for the next running of the model (e.g., the model may be run again in less than 10 seconds, or even less than 1 second). In one embodiment, a user category is assigned to a user, the user behavior is observed, and then analysis is done to see if the user's behavior is inconsistent with the user category that has been assigned. If it is inconsistent, then the model is run again and the user category is changed to a different category.

In one example, if the model runs every couple of seconds, in that time period since the last model run, there will be new user behavior and new user actions. A few seconds (e.g., less than 10 seconds later) there will be a distinctly different model based on different data that has been gathered (from the user and from yet other users of other, different computing devices). The threshold scores for each user category are recalculated, and users re-assigned to different categories as may be appropriate for each user. The model automatically continues to re-evaluate what the user has recently done, and to recalculate probabilities.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   storing, in a data repository, a plurality of user categories including a first user category, wherein at least one action is associated with each of the user categories, including a first action associated with the first user category, and wherein the first action is a function to be implemented on computing devices of users in the first user category;
   receiving, by a server, over a network, first data gathered by software on a computing device of a user, wherein the first data comprises a plurality of user actions performed by the user on the computing device;
   receiving, by the server, second data gathered from a source other than the computing device, the second data including network traffic information for the user;
   determining, by the server, a score associated with each of the plurality of user categories, including determining, based at least on the network traffic information, a first score associated with the first user category;
   analyzing, by at least one processor of the server, the first data and the second data to provide an output decision based on a determination that the user is in the first user category; and
   sending, by the server, over the network, the output decision and the first score to the computing device of the user, thereby enabling the computing device to make a local decision based on the first score whether to implement the first action on the computing device.

2. The method of claim 1, wherein the software is a first application, and the first action is for a second application on the computing device.

3. The method of claim 1, wherein the function has been stored on the computing device prior to the gathering of the first data by the software.

4. The method of claim 1, further comprising sending the function to the computing device.

5. The method of claim 1, wherein the sending of the output decision is performed after the receiving the first data.

6. The method of claim 1, wherein the output decision is a first output decision, and the method further comprising:
   receiving third data gathered by the software on the computing device, wherein the third data comprises at least one user action performed by the user on the computing device;
   analyzing the third data to provide a second output decision; and
   sending the second output decision to the computing device for implementing a second action on the computing device.

7. The method of claim 1, wherein the computing device stores a predetermined threshold value for comparison to the first score.

8. A system, comprising:
   a data repository storing a plurality of user categories including a first user category, and further storing at least one action associated with each of the user categories, including a first action associated with the first user category, wherein the first action is a function to be implemented on computing devices of users in the first user category;
   at least one processor; and
   memory storing instructions configured to instruct the at least one processor to:
      receive, by a server, over a network, first data gathered by software on a first computing device of a user, wherein the first data comprises at least one user action performed by the user on the first computing device;
      receive, by the server, second data gathered from a source other than the first computing device, the second data comprising network traffic information for the user;
      determine, by the server, a score associated with each of the plurality of user categories, including determining, based at least on the network traffic information, a first score associated with the first user category;
      analyze, using a user classification model, the first data and the second data to classify the user into the first user category; and
      in response to classifying the user into the first user category, send the first action and the first score to the first computing device, thereby enabling the first computing device to make a local decision based on the first score whether to implement the first action on the first computing device.

9. The system of claim 8, wherein the first score is a probability value or a confidence value.

10. The system of claim 8, wherein the sending of the first action is conditional on a comparison of the first score to a threshold value.

11. The system of claim 8, wherein the instructions are further configured to instruct the at least one processor to:
    receive a selection from the user to adjust the user classification model, the selection provided by the user on a user interface of the first computing device; and
    adjust the user classification model based on the selection.

12. The system of claim 8, wherein the decision is based at least on a comparison of the first score to a threshold value stored on the first computing device.

13. A non-transitory computer-readable storage medium storing computer-readable instructions, which when executed, cause a computing device of a user to:
    gather, via at least one processor, first data on the computing device, wherein the first data comprises at least one user action performed by the user on the computing device;
    send, over a network, the first data to a server configured to classify the user into a first user category of a plurality of user categories stored at the server in a data repository, wherein the classifying is based on analysis of the first data and network traffic information for the user gathered and received from a source other than the computing device, the data repository includes at least one action corresponding to the first user category, and the at least one action includes a function to be implemented on computing devices of users in the first user category;

receive, from the server, based on a determination that the user is in the first category, the at least one action and a first score associated with the first user category, wherein the first score is based at least on the network traffic information, and the first score is one of a plurality of scores stored on the server, each of the plurality of scores associated with a respective one of the plurality of user categories; and implement, via the at least one processor, the at least one action on the computing device, wherein the at least one action is implemented in response to a decision, made locally by the computing device, based on the first score.

14. The computer-readable storage medium of claim 13, wherein the instructions further cause the computing device to present, on a display of the computing device, a user interface to the user, the user interface comprising a first user interface element.

15. The computer-readable storage medium of claim 14, wherein the implementing the at least one action comprises updating the user interface.

16. The computer-readable storage medium of claim 15, wherein the updating the user interface comprises adding a second user interface element.

17. The computer-readable storage medium of claim 16, wherein the first user interface element is a first user input field, and the second user interface element is a second user input field.

18. The computer-readable storage medium of claim 14, wherein the at least one user action is performed by the user via the user interface.

19. The computer-readable storage medium of claim 13, wherein the first data is gathered by software running on the computing device, and the gathering the first data begins after installation of the software on the computing device.

20. The computer-readable storage medium of claim 13, wherein the decision comprises a comparison of the first score to a threshold value stored in memory of the computing device.

* * * * *